US007277029B2

(12) United States Patent
Thiesson et al.

(10) Patent No.: US 7,277,029 B2
(45) Date of Patent: Oct. 2, 2007

(54) USING LANGUAGE MODELS TO EXPAND WILDCARDS

(75) Inventors: Bo Thiesson, Woodinville, WA (US); Kenneth Ward Church, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 202 days.

(21) Appl. No.: 11/159,711

(22) Filed: Jun. 23, 2005

(65) Prior Publication Data

US 2006/0290535 A1   Dec. 28, 2006

(51) Int. Cl.
*H03M 11/00* (2006.01)
(52) U.S. Cl. .............. 341/22; 340/825.69; 341/176; 704/1
(58) Field of Classification Search .......... 341/22; 704/7, 8, 9, 10, 200
See application file for complete search history.

(56) References Cited

U.S. PATENT DOCUMENTS

| 5,386,556 | A | 1/1995 | Hedin et al. ............ 395/600 |
| 5,485,372 | A | 1/1996 | Golding et al. ........ 364/419.08 |
| 5,963,671 | A | 10/1999 | Comerford et al. ........ 382/230 |
| 6,408,266 | B1* | 6/2002 | Oon ........................ 704/1 |
| 6,573,844 | B1 | 6/2003 | Venolia et al. ............ 341/22 |
| 6,654,733 | B1 | 11/2003 | Goodman et al. ........ 706/52 |
| 6,785,677 | B1 | 8/2004 | Fritchman ................ 707/6 |
| 6,801,190 | B1 | 10/2004 | Robinson et al. ........ 345/173 |
| 7,107,204 | B1* | 9/2006 | Liu et al. ................ 704/2 |
| 2003/0061027 | A1 | 3/2003 | Weise et al. ............ 704/9 |
| 2004/0201607 | A1 | 10/2004 | Mulvey et al. .......... 345/708 |
| 2004/0260534 | A1 | 12/2004 | Pak et al. ................ 704/7 |
| 2006/0163337 | A1* | 7/2006 | Unruh .................. 235/145 A |

FOREIGN PATENT DOCUMENTS

EP   0 924 594 A2   6/1999
WO   WO 01/82119 A2   11/2001

OTHER PUBLICATIONS

"Using the Word Wheel", Technical Tips, http://www.isys-search.com/support/techtips/wordwheel.html.
MSN Desktop Search (beta), http://www/pcmag.com/article2/0,1759,1771841,00.asp.
Jelinek, F., "Statistical Methods for Speech Recognition", pp. 60-67, 1997.

* cited by examiner

*Primary Examiner*—Brian Zimmerman
*Assistant Examiner*—Hung Q Dang
(74) *Attorney, Agent, or Firm*—John D. Veldhuis-Kroeze; Westman, Champlin & Kelly, P.A.

(57) ABSTRACT

A method of inputting text is provided in which a first portion of an input string is received from a user, the first portion of the input string including at least one keystroke representing a wildcard character of the input string. A second portion of the input string is then received, with the second portion including one or more keystrokes all representing non-wildcard characters of the input string.

15 Claims, 6 Drawing Sheets

600 ⟶

605 — RECEIVE AN INPUT STRING REPRESENTING, IN A FIRST LANGUAGE, CHARACTERS FORMING AT LEAST A PORTION OF A PHONETIC PRONUNCIATION IN THE FIRST LANGUAGE OF INTENDED TEXT IN A SECOND LANGUAGE, THE INPUT STRING INCLUDING AT LEAST ONE WILDCARD CHARACTER

610 — USE A LANGUAGE MODEL TO IDENTIFY TEXT MATCHES, IN THE SECOND LANGUAGE, CORRESPONDING TO THE RECEIVED INPUT STRING INCLUDING THE AT LEAST ONE WILDCARD CHARACTER

615 — DISPLAY TO THE USER THE IDENTIFIED TEXT MATCHES, IN THE SECOND LANGUAGE, CORRESPONDING TO THE RECEIVED INPUT STRING

620 — SELECT IN RESPONSE TO A USER INPUT ONE OF THE IDENTIFIED TEXT MATCHES, IN THE SECOND LANGUAGE, AS THE TEXT TO INPUT

FIG. 6

USING LANGUAGE MODELS TO EXPAND WILDCARDS

BACKGROUND

The discussion below is merely provided for general background information and is not intended to be used as an aid in determining the scope of the claimed subject matter.

Small computing devices such as mobile phones and personal digital assistants (PDA's) are used with an ever increasing frequency. The computing power of these devices has allowed them to be used to access and browse the internet as well as store contact information, review and edit text documents, and perform other tasks. Additionally, it has become very popular to send and receive text messages with mobile devices. For example, The Short Message Service (SMS) for mobile phones has been a tremendous success in the text messaging roadmap. As a result, these devices provide many applications in which text entry is required. Unfortunately, such text entry on mobile devices can be cumbersome because they lack a standard full-sized keyboard.

Currently, there are two common ways to achieve text input using numeric key pads found on most mobile phones, a multiple-tap approach, and a single-tap approach. With the multiple-tap approach, a user presses a numeric key a number of times to enter the desired letter, where most of the numeric keys are mapped to three or four letters of the alphabet. For example, the 2 key is usually mapped to the letters A, B, and C. If the user presses the two key once, the letter A is entered. If the user presses the two key twice, the letter B is entered, and if the user presses the two key three times, the letter C is entered. Pauses between entry of successive letters of a word are sometimes necessary, so that the device knows when to advance the cursor to the next letter-entry position. For example, suppose a user wished to search for "MSN", entering the text for the search using a cell phone or other device with a telephone style keypad. Using the multiple-tap approach, the user might press the 6 key to enter the letter M, pause, press the 7 key four times to enter the letter S, pause again, then press the 6 key twice to enter the letter N. As mentioned, the pauses are frequently necessary for disambiguation. Other keys that are present on numeric keypads, such as the pound ("#") and asterisk ("*") keys, among other keys, are typically mapped to remaining symbols in the language, or to switch between numbers, upper-case, and lower-case letters.

While the multiple-tap approach is usable in that users can enter any word using only the numeric keys, it can be disadvantageous for quick and intuitive text entry. Typing an input string such as "MSN" that only requires three key presses on a standard keyboard, one for each letter, could require seven key presses on numeric keys using the multiple-tap approach. As compared to using a standard keyboard, using numeric keys with the multiple-tap approach to achieve text entry means that the user presses many keys even for short messages.

Another approach to text entry using numeric keys is the single-tap-dictionary approach. Under the single-tap approach, the user presses the numeric key associated with the desired letter once, even though the numeric key may be mapped to three or four different letters. When the user enters a number sequence for a word, the device attempts to discern the word that the user intended to enter, based on the number sequence. Each number sequence is mapped to a common word that corresponds to the sequence. For example, the number sequence 43556 can potentially correspond to any five-letter word having a first letter G, H, or I, since the 4 key is usually mapped to these letters. Similarly, the sequence potentially corresponds to any five-letter word having a second letter D, E, or F, a third and fourth letter selected from the letters J, K, and L, and a fifth letter M, N, or O, since the 3, 5, and 6 keys are usually mapped to these respective letters. However, because the most common five-letter word corresponding to the number sequence 43556 is the word "hello" in one example, the single-tap approach may always enter this word when the user presses the 4, 3, 5, 5, and 6 keys in succession to input this number sequence.

The single-tap approach can have advantages over the multiple-tap approach, but can also present new disadvantages. Advantageously, the single-tap approach helps to ensure that the user only has to press the same number of keys as the number of letters in a desired word. For example, the multiple-tap approach requires the user to press the 2 key six times to enter the word "cab". Conversely, the single-tap approach potentially only requires the user to press the 2 key three times to enter this word, assuming that the number sequence 222 is mapped to the word "cab." Therefore, the single-tap approach can be more key-efficient than the multiple-tap approach for text entry using numeric keys. It can also be almost as key-efficient as using a standard keyboard that has a single key for each letter.

The single-tap approach can be disadvantageous relative to the multiple-tap approach in that the word mapped to a given number sequence may not be the word the user intended to enter by inputting the sequence. For example, the numeric key sequence 7333 corresponds to both the words "seed" and "reed." Because only one word is mapped to each numeric key sequence, the word "seed" may be entered when the user keys in the numeric key sequence 7333, whereas the user may have intended to enter the word "reed." The single-tap approach is especially useful where there is only one unique word for a given numeric key sequence, or, if there are a number of words for a given sequence, when the user wishes to input the most common word associated with the sequence. Where the word mapped by the single-tap approach is not the intended word, text entry may revert back to the multiple-tap approach or to an error-correction mode. Ultimate text entry of the intended word may then require more keystrokes than if the user had started with the multiple-tap approach.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Disclosed embodiments, which can be in some cases be generalizations of word wheeling, use language models to find the most likely expansion of wildcards consistent with an input pattern. A user provides an input string having at least one wildcard character at a position which is not at the end of the string. With the use of wildcard characters, the number of keystrokes used to enter the string can be significantly reduced. The language model can be used to provide wildcard expansion of the input string to identify the most likely matches. The user can then select one of the most likely matches as text to input.

BRIEF DESCRIPTION OF THE DRAWINGS

FIG. 6 is a flowchart illustrating a method of inputting text in an input method editor (IME) system.

DETAILED DESCRIPTION

Figure 2:
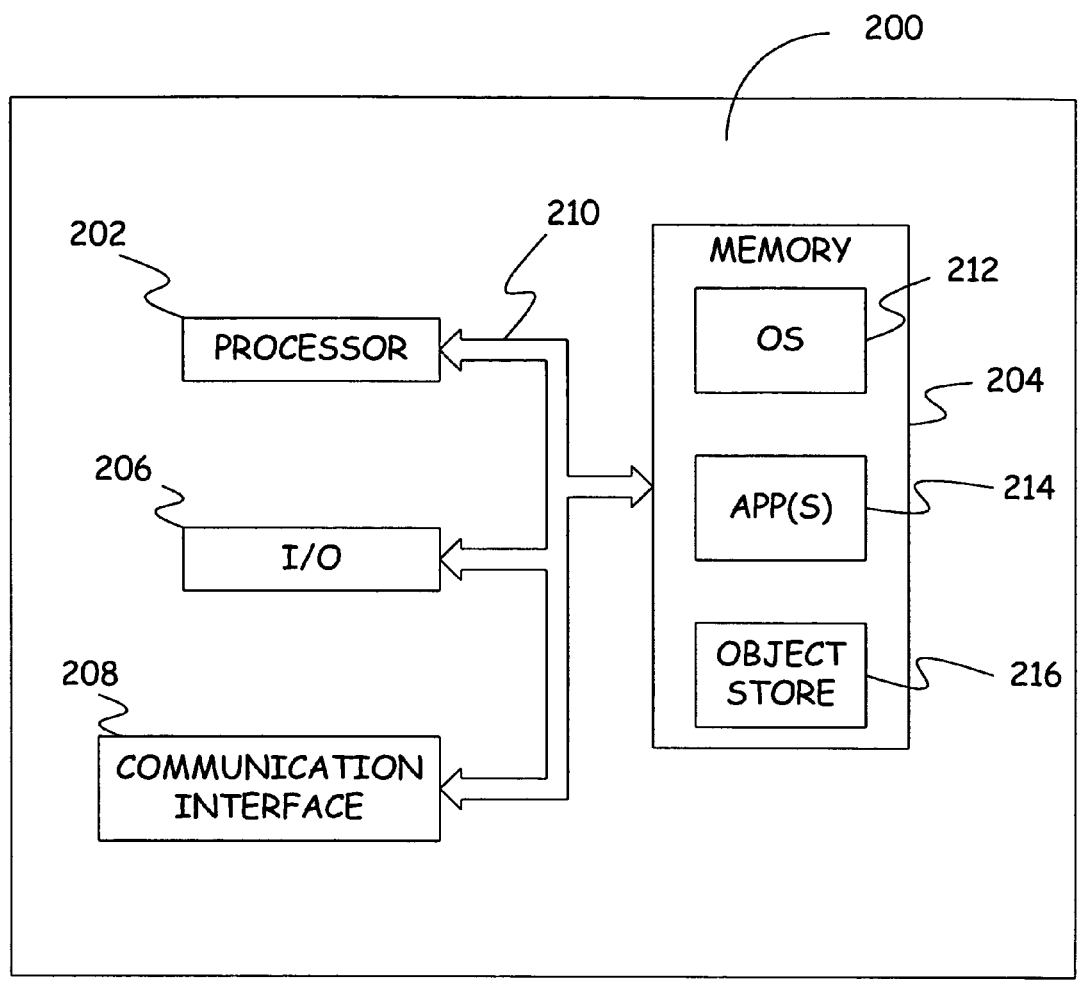
FIG. 2 is a block diagram of a mobile computing environment in which disclosed concepts can be practiced.
Figure 3:
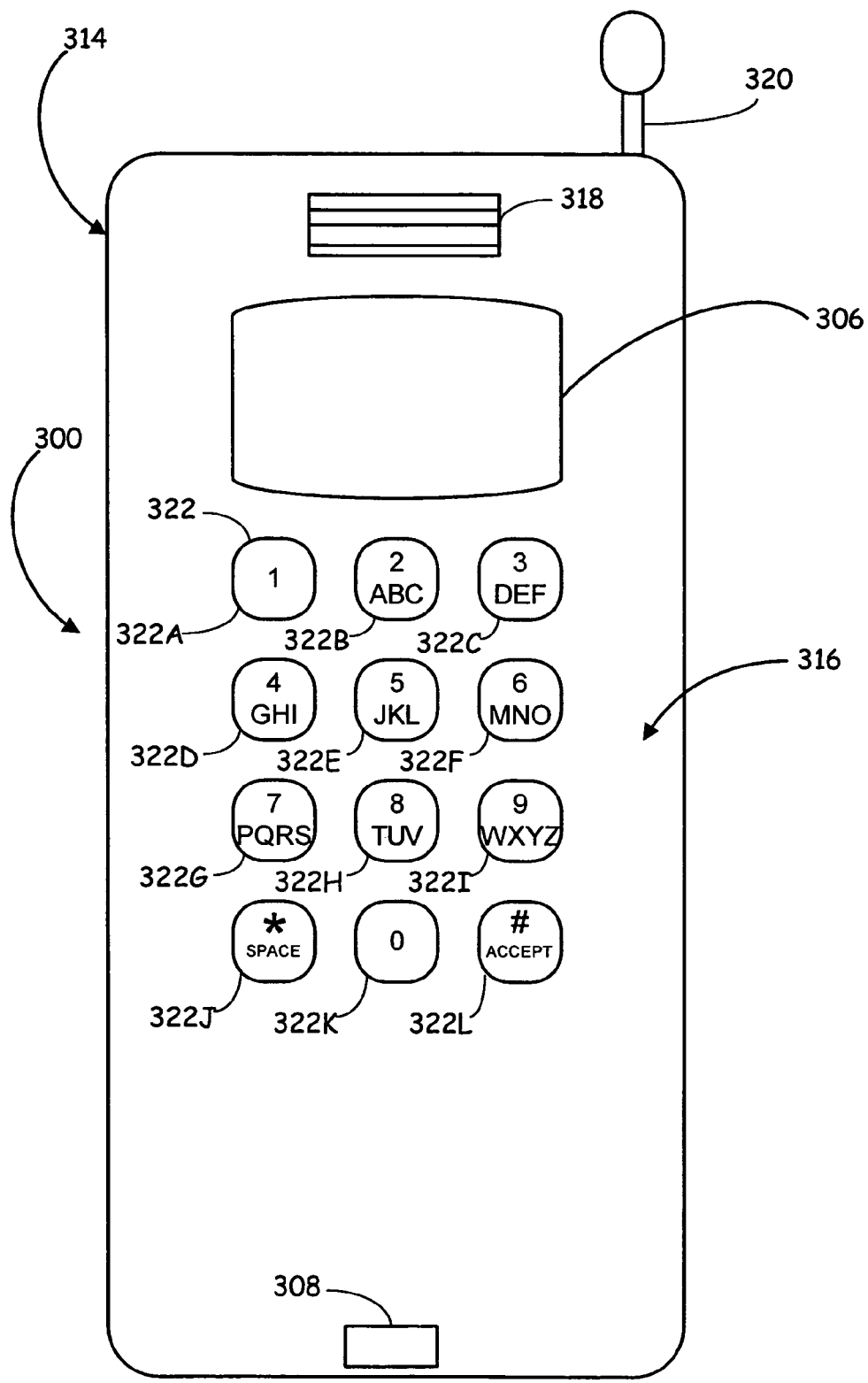
FIG. 3 is diagrammatic illustration of a mobile telephone computing environment in which disclosed concepts can be practiced.

The following description is provided in the context of methods and systems for inputting or entering text in an efficient manner using wildcard characters and language model expansions of input strings containing the wildcard characters. Examples of such systems include input method editors (IMEs) of the type embodied in a computing environment such as the one described generally below with reference to FIG. 1. Other examples of such systems include text messaging or e-mail systems in mobile computing environments such as the ones described generally below with reference to FIGS. 2 and/or 3. FIG. 2 illustrates a mobile computing device generally, while FIG. 3 illustrates a mobile telephone type computing environment. Before describing aspects of the illustrated embodiments, however, it may be useful to describe the example suitable computing environments shown in FIGS. 1-3.

Figure 1:
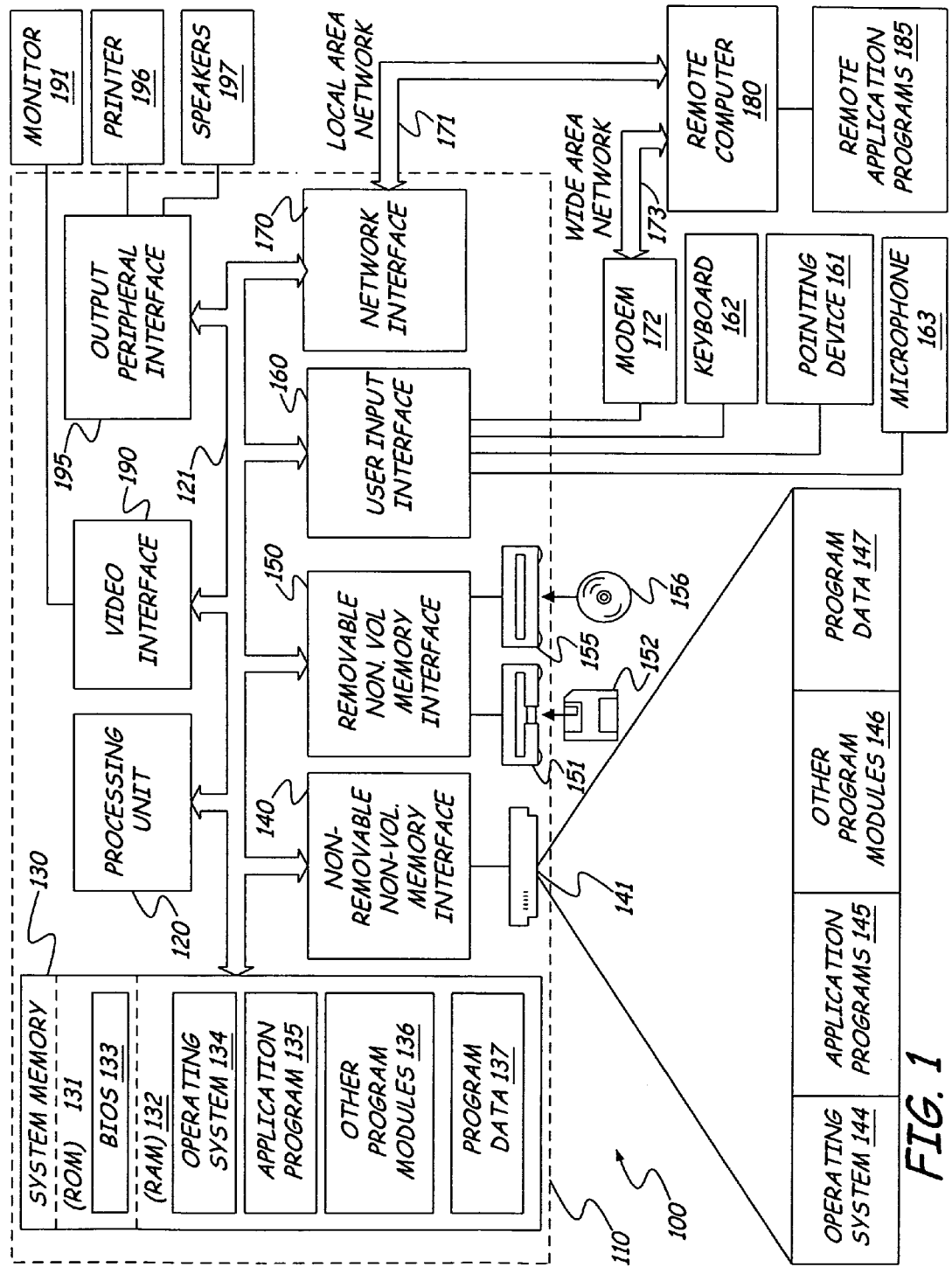
FIG. 1 is a block diagram of a general computing environment in which disclosed concepts can be practiced.

FIG. 1 illustrates an example of a suitable computing system environment 100 on which one or more aspects of the illustrated embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

FIG. 2 is a block diagram of a mobile device 200, which is also an exemplary computing environment for certain illustrated embodiments. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 can be executed by processor 202 from memory 204. Operating system 212, in one embodiment, is a WINDOWS® CE brand operating system commercially available from Microsoft Corporation. Operating system 212 can be of the type designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. Input/output components 206 can include keyboards or keypads of various types found in mobile computing devices for text entry. For example, components 206 can include full keyboards of reduced physical size, virtual keyboards displayed on a touch-sensitive screen, limited character keypads of the type typically found in mobile telephones in which each numeric key is mapped to multiple letters, etc. The devices listed above are by way of example and need not all be present on mobile device 200. In addition, other input/output devices may be attached to or found with mobile device 200

Mobile computing devices, such as mobile phones, often utilize a limited character input device in the form of a numeric keypad. FIG. 3 is a simplified diagram of a device 300 in the form of a mobile phone 314 that includes such a numeric keypad 316, a display 306 and a microphone 308. Mobile phone 314 can also includes a speaker 318, an antenna 320 as well as communications circuitry in the form of a transceiver (not shown) and other components, which are not pertinent to the present invention.

Numeric keypad 316 includes a number of numeric keys 322 and other keys. In general, numeric keypad 316 is distinguished from a standard keyboard in that it does not have a unique key for each character. As a result, numeric keypad 316 is a limited character input device. In one example embodiment, keypad 316 has the following number of keys: a one key 322A, a two key 322B, a three key 322C, a four key 322D, a five key 322E, a six key 322F, a seven key 322G, an eight key 322H, a nine key 322I, and a zero key 322K. Numeric keypad 316 also has an asterisk (*) key 322J, and a pound sign (#) key 322L. Numeric keypad 316 may also have other specialized keys beyond those shown in FIG. 3, or fewer keys than those shown in FIG. 3. The keys 322 of numeric keypad 316 may be real, physical keys, or virtual, soft keys displayed on display 306, where display 306 is a touch-sensitive screen.

All of the number keys 322 of numeric keypad 316, except for the one key 322A and the zero key 322K, correspond to three or four letters of the alphabet. The two key 322B corresponds to letters A, B, and C. The three key 322C corresponds to the letters D, E, and F. The four key 322D corresponds to the letters G, H, and I. The five key 322E corresponds to the letters J, K, and L. The six key 322F corresponds to the letters M, N, and O. The seven key 322G corresponds to the letters P, Q, R, and S. The eight key 322H corresponds to the letters T, U, and V. Finally, the nine key 322I corresponds to the letters W, X, Y, and Z. Punctuation characters and symbols may be included either on unused keys, such as the one key 322A, or may be also included on the other number keys 322, along with the letters. Additionally, each number key 322 can be used to enter the number or symbol that is labeled thereon. It must be noted that the keypad configuration shown in FIG. 3 is provided as an example and that other configurations can be used with the disclosed embodiments.

Computing devices 100, 200 and 300 utilize a wildcard text input technique as described below. The wildcard text input technique can significantly reduce the number of key presses that are required to enter desired text. This is accomplished through use of language model expansion of wildcards. In the context of a keypad text entry device such as keypad 316, the wildcard text entry technique can be used in conjunction with single-tap and/or multiple-tap text entry techniques.

In text input applications such as entering a query into a search engine or entering a web address into a browser address bar, a technique known as "word wheeling" is often used. Word wheeling can be thought of as a special case where a wildcard is added by the application or system, as opposed to by the user, at the end of whatever the user types. The user types a prefix. After each character, the system produces a list of the k most popular web queries that start with the specified prefix. Word wheeling is especially popular when users don't know what questions they should be asking, or they are using a device like a mobile phone or a PDA with limited keyboard or keypad capabilities. Word wheeling not only helps when users know what they want to say, but it also helps when users don't know what to say. Some user's can't spell very well, with others, things get stuck on the tip of their tongue. Some users are just browsing. They aren't looking for anything in particular, but they'd like to know what others are looking at. Word wheeling can be helpful to each of these types of users.

Some embodiments of the illustratively disclosed methods, systems and apparatus utilize a generalization of word wheeling. In these embodiments, if the user types a simple string such as "New Y", then the system suggests a number of completions such as "New York" and "near year's" by effectively adding a wildcard to the end of the user's input string. However, these embodiments also allow the user to type in wild cards themselves, even in positions which are not at the end of the input string. Here are some examples of input strings (left hand side) which could be entered by a user (* denotes a wildcard character entered by the user), and the intended input text (right hand side) corresponding to the strings:

1. n* y* day→new year's day
2. n* y* c*→New York City
3. ron* r*g*n→Ronald Reagan
4. b*fast of *→breakfast of champions
5. raining c* and*→raining cats and dogs
6. g* spokes*→government spokesman Disclosed embodiments use a language model (e.g., trigrams) to find the most likely expansion of wild cards that is consistent with the input pattern. Language models are commonly used in speech recognition and other noisy channel applications such as context sensitive spelling correction. For different applications, the language model used can be trained on different training sets. For web searching, for example, it would be useful to train on some combination of query logs and web documents. For entering text into a text editor such as Microsoft Word, it would be useful to train on typical word documents. For IM (instant messaging) applications, training could be done on a collection of IM logs, etc.

There are great opportunities for personalization of this technique. In the text editor case, the language model could be trained on the user's documents. The training could be performed inside an indexer such as MSN Desktop Search. Wild card expansion of input text can be thought of as an alternative to spelling correction from some perspectives. It can also be useful in ESL (English as a second language) contexts, where the user is not confident about collocations. For example, consider an example where a non-native speaker types the different phrase: "there is lots of future works." The disclosed methods, which are described in further detail below, can be used to aid this non-native speaker. For example, if he had entered the input string "there is * of future work*," the described techniques may have suggested the text "there is plenty of future work."

To further illustrate the wildcard text input methods, consider another example. Suppose a user wants to find Condoleezza Rice, but doesn't know how to spell her name. Even if the user could spell her name, doing so on a limited character input device such as a mobile phone keypad would be cumbersome due to the number of letters required to be input. Using the wildcard text input methods, the user could spell (i.e., by entering text) Condoleezza as 2*, where the 2 key represents the single-tap character possibilities of [ABCabc2], and where * is the wildcard. The user could then type '#' for space. Rice is easy to spell: 7423. Thus, the user types, 2*#7423, and the system searches over the query logs (or other index for the particular implementation) to produce a list of k-best (most popular) matches:

1. Anne Rice
2. Book of Shadows
3. Chris Rice
4. Condoleezza Rice

5. Ann Rice
8. Condoleeza Rice

In this example shown above, the letters matching constants in the regular expression are underlined. The other letters match wildcards. An implicit wildcard (entered by the system as opposed to entered by the user) is appended to the end of the input string. The disclosed methods and systems include one or more wildcards prior to the end of the input string.

There are many potential uses for, and benefits of, text inputting methods using the disclosed wildcard techniques. For example, alphabetic ordering causes bizarre behavior. Yellow Pages are full of company names starting with A, AA, AAA, etc. If prefix matching tools (e.g., certain types of search engines) increase in popularity, then it is just a matter of time before companies start to go after valuable prefixes: mail, maps, etc. Wildcards can help society avoid the nuisances resulting from such behavior. If you want to find a top mail site, using the text entry methods described here, the user can type, "*mail" and likely find k-best results of value, for example, like Gmail, Hotmail, Yahoo mail, etc.

The disclosed methods also provide significant opportunity for collaboration and personalization. Users quickly learn when they can get away with wildcards. Typing therefore becomes a collaborative exercise between the system and the user. Collaboration can be even more powerful in the web context. Users issue lots of queries, making it clear what's popular or hot (and what's not). The text input systems disclosed here can be configured such that they construct language models based on these queries to direct users toward good information (e.g., most commonly searched subjects or sought after results). More and more users will then go there, causing the hot query to move up in the language model. In this way, collaboration can be viewed as a positive feedback loop. There is a strong herd instinct; all parties benefit from the follow-the-pack collaboration. In addition, users want personalization. When typing names of friends and family, technical terms, etc., individuals should be able to get away with more wildcards than other users would. There are many opportunities for personalizing the language model by integrating the language model with a desktop search index.

The text input methods, apparatus and systems utilizing the disclosed concepts, can be tailored for different modes of operation, to use different language models, and/or for use with different applications. For example, the systems can be tailored based on the type of text input device used (e.g., phone keypad, soft keyboard, standard keyboard, etc). In many embodiments, regardless of the type of text input device used, the system uses a language model to find the k-best expansions of the wildcards.

There are many options which can be used with the disclosed methods and systems in terms of different language models, including using one or more of a number of standard trigram language models. The language models can be trained on large quantities of different languages (e.g., English, Spanish, German, etc.). Still others are trained on small sub-domains. In one embodiment, the system contains two special purpose language models for searching popular web queries, and popular web domains. Different language models are different. In one example, with a trigram language model trained on general English (containing large amounts of newswire collected over the last decade), the input string "pres* rea* *d y* t* it is v* imp*" results in a suggested text input of "President Reagan said yesterday that it is very important." The quotation marks used in this example are for illustrating the beginning and the end of the input string, and are not part of the input string itself. Again, for purposes of illustration in this disclosure, the letters matching constants in this example input string from a user are underlined in the suggested text which was suggested by the system as the input, while the other letters match the wildcards (the * characters in the input string in this example). As another example, using a trigram model trained on Spanish, the input string "pres* rea*" results in a suggested text input of "presidente Reagan."

The disclosed text input systems and methods can also be used as a tool to debug language models. In one example of this, some French had slipped into the English training corpus. Consequently, the English language model expanded the * (i.e., wildcard) in "en * de" to some common French words that happen to be English words as well: raison, circulation, oeuvre, place, as well as <OOV> (corresponding to out of vocabulary in language model terms). Other anomalies in the training corpus were also discovered using the methods and systems, such as headers from the AP news.

There are also ESL (English as a Second Language) applications for the concepts described in this disclosure. Many users have a stronger active vocabulary than passive vocabulary. If the user has a word stuck on the tip of their tongue, they can type a suggestive context with appropriate wildcards and there is a good probability the system will propose the word the user is looking for. Similar uses are available in monolingual contexts. Suppose a user isn't sure how to spell a celebrity's name. If they provide a suggestive context in the input string, the language model is likely to get it right. See the following examples:

ron* r*g*n→Ronald Reagan
don* r*g*n→Donald Regan
c* rice→Condoleezza Rice

To summarize, the wildcard text input concepts disclosed here are helpful in many text inputting applications, for example including devices without a full sized keyboard (cell phones, PDA's, Tablet personal computers, etc), applications where speed of text inputting matters (e.g., instant messaging, email, etc), in systems which aid in language skills (e.g., provide proper spelling suggestions, ESL applications suggesting proper collocations, etc), and in browsing (systems which direct users to popular topics).

Indexing and compression are used in some embodiments of the disclosed systems and methods. The k-best string matching problem raises a number of interesting technical challenges. Consider the use of two types of language models: trigram language models and long lists (for finite languages such as the 7 million most popular web queries). The long lists are indexed with a suffix array. Suffix arrays generalize very nicely to phone mode, as described below. The list of web queries were treated as a text of N bytes. (Newlines are replaced with end-of-string delimiters.) The suffix array, S, is a sequence of N integers. The array is initialized with the integers from 0 to N−1. Thus, $S[i]=i$, for $0 \leq i < N$. Each of these integers represents a string, starting at position i in the text and extending to the end of the string. S is then sorted alphabetically.

Suffix arrays make it easy to find the frequency and location of any substring. For example, given the substring "mail," we find the first and last suffix in S that starts with "mail." The gap between these two is the frequency. Each suffix in the gap points to a super-string of "mail."

To generalize suffix arrays for a phone mode of an example system, alphabetical order string comparison (strcmp) was replaced with phone order string comparison (phone-strcmp). Both strcmp and phone-strcmp compares each character one at a time for two strings being considered. In standard alphabetic ordering, 'a'<'b'<'c', but in phone-strcmp, the characters that map to the same key on the phone keypad are treated as equivalent.

As used here, suffix arrays are generalized to take advantage of popularity weights. It is not a goal to find all queries that contain the substring "mail," but rather, just the k-best (most popular). The standard suffix array method will work, if a filter is added on the output that searches over the results for the k-best. However, that filter could take O(N) time if there are lots of matches, as there typically are for short queries.

An improvement is to sort the suffix array by both popularity and alphabetic ordering, alternating on even and odd depths in the tree. At the first level, the suffix array is sorted by the first order, then the suffix array is sorted by the second order and so on. When searching a node ordered by alphabetical order, standard suffix array techniques can be used. But when searching a node ordered by popularity, the more popular half is searched before the second half. If there are lots of matches, as there are for short strings, the index makes it very easy to find the top-k quickly, and the system won't have to search the second half very often. If the prefix is rare, then it might be beneficial to search both halves, and therefore, half the splits (those split by popularity) are useless for the worst case, where the input substring doesn't match anything in the table. Lookup is O(sqrt N).

Wildcard matching is, of course, a different task from substring matching. Finite State Machines are a good way to think about the k-best string matching problem with wildcards. In practice, the input strings often contain long anchors of constants (wildcard free substrings). Suffix arrays can use these anchors to generate a list of candidates that are then filtered by a regular expression package.

Memory is limited in many practical applications, especially in the mobile context in which case compression of the language model may become a priority. Much has been written about lossless compression of language models. If memory is extremely limited one may choose to tradeoff memory for loss in accuracy by applying a lossy compression method. For trigram models, for example, a lossy Golomb code compression can be used as follows. Each trigram <x, y, z> is mapped into a hash code $h=(V^2x+Vy+z)$ % P, where V is the size of the vocabulary and P is an appropriate prime. P trades off memory for loss—a smaller P demands less memory but inflicts more loss, and the other way around. The N trigrams are hashed into h hash codes. The codes are sorted. The differences, x, are encoded with a Golomb code, which is an optimal Huffman code, assuming that the differences are exponentially distributed, which they will be, if the hash is Poisson. The sorted hash values can, as a good approximation, be considered as created by a Poisson process.

Figure 4:
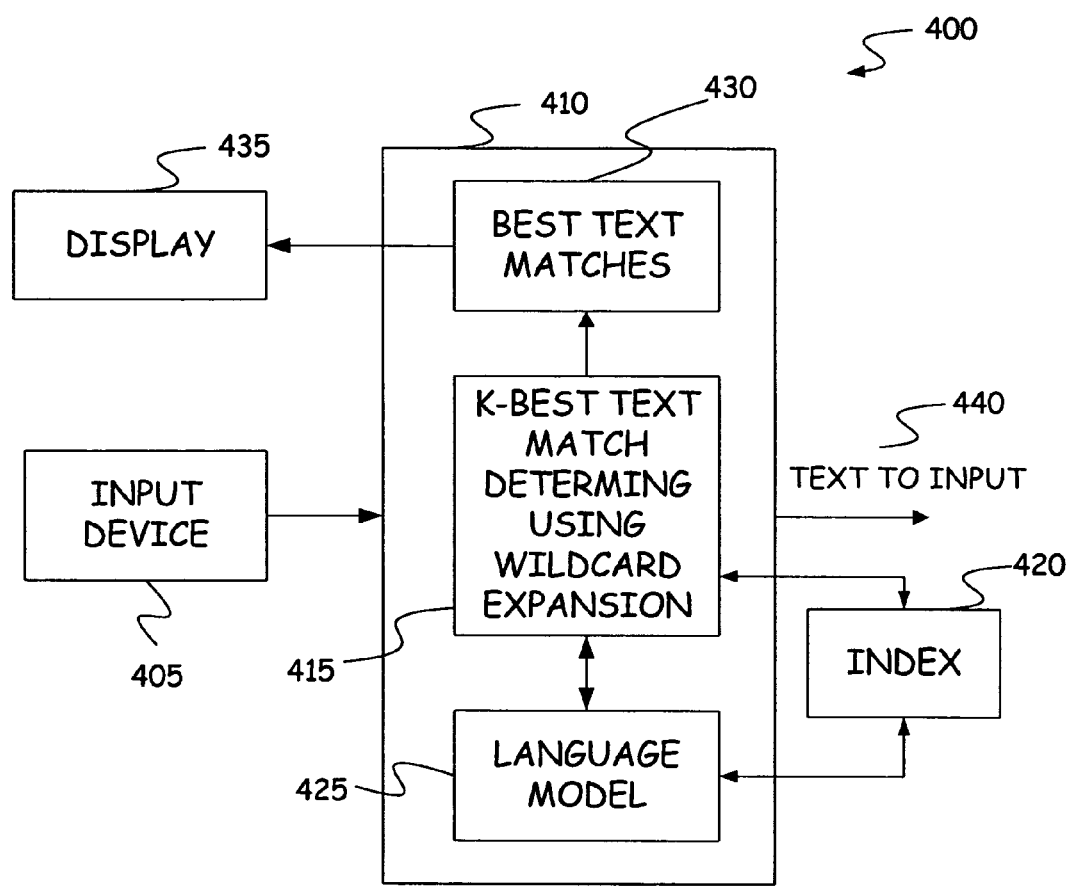
FIG. 4 is a block diagram illustrating text entry system.

Referring now to FIG. 4, shown is a system, apparatus or device 400 having a text entry system which is configured to implement a method for inputting text as described above. The device 400 can be a mobile computing device such as devices 200 and/or 300 shown in FIGS. 2 and 3, or it can be a computing environment such as represented in FIG. 1. The embodiment is not limited to any particular computing environment, and these are provided for illustrative purposes. In an exemplary embodiment, device 400 can be a mobile telephone such as a cell phone, a PDA, or other mobile devices. Although not limited to such, these exemplary embodiments are particularly of the type that have either a limited character keypad as described above, or a full keyboard that is either or both of a reduced size (compared to standard computer keyboards) or is provided virtually by means of a touch-sensitive display screen.

Using input device 405, which can be as described above, a user provides an input string containing a wildcard character at a position other than, or in addition to, the end position of the input string. Further, multiple wildcard characters can be included in the input string. Wildcard placement examples are provided above in the general discussion of disclosed embodiments. In embodiments in which a limited character keypad is used, the processing circuitry 410 can be configured to facilitate entry of the input string using techniques such as the single-tap and multiple-tap techniques described above.

Processing circuitry 410 is configured to implement various modules, functions or components to execute the text input method. One such function is the k-best match determining function 415. Using the input string representing the desired input text but containing one or more wildcard characters as described, processing circuitry 410 uses language model 425 to identify the k-best text matches 430. The number k or text matches identified can be any desired number. Any suitable language model, trained using a corpus, database or other appropriate training data, can be used. For example, a trigram language model can be used. In one exemplary embodiment, a trigram language model using a Golomb code is used. However, the embodiments are not limited to use with any particular language model. In exemplary embodiments, the k-best text matches corresponding to the input string containing the wildcard are identified from an index 420 of possible text matches.

In exemplary embodiments, at least some of the k-best text matches are displayed to the user on display device 435. The best text matches can be displayed in a ranked order based on a score. In exemplary embodiments, the scores are statistical scores or probabilities determined using the language model. Using input device 405 to scroll, browse, select, etc, the user can then quickly identify the one of the displayed best text matches which was the intended text to input. This is then provided as text 440 to input. Thus, with far fewer key or keypad strokes than would ordinarily be necessary, the user can input the intended text for a particular application. Examples of applications which can be executed or accessed on device 400, and for which this text input method can be useful, include text messaging applications, e-mail applications, web surfing and other search engine applications, etc. The disclosed embodiments are not limited to these example applications however.

Figure 5:
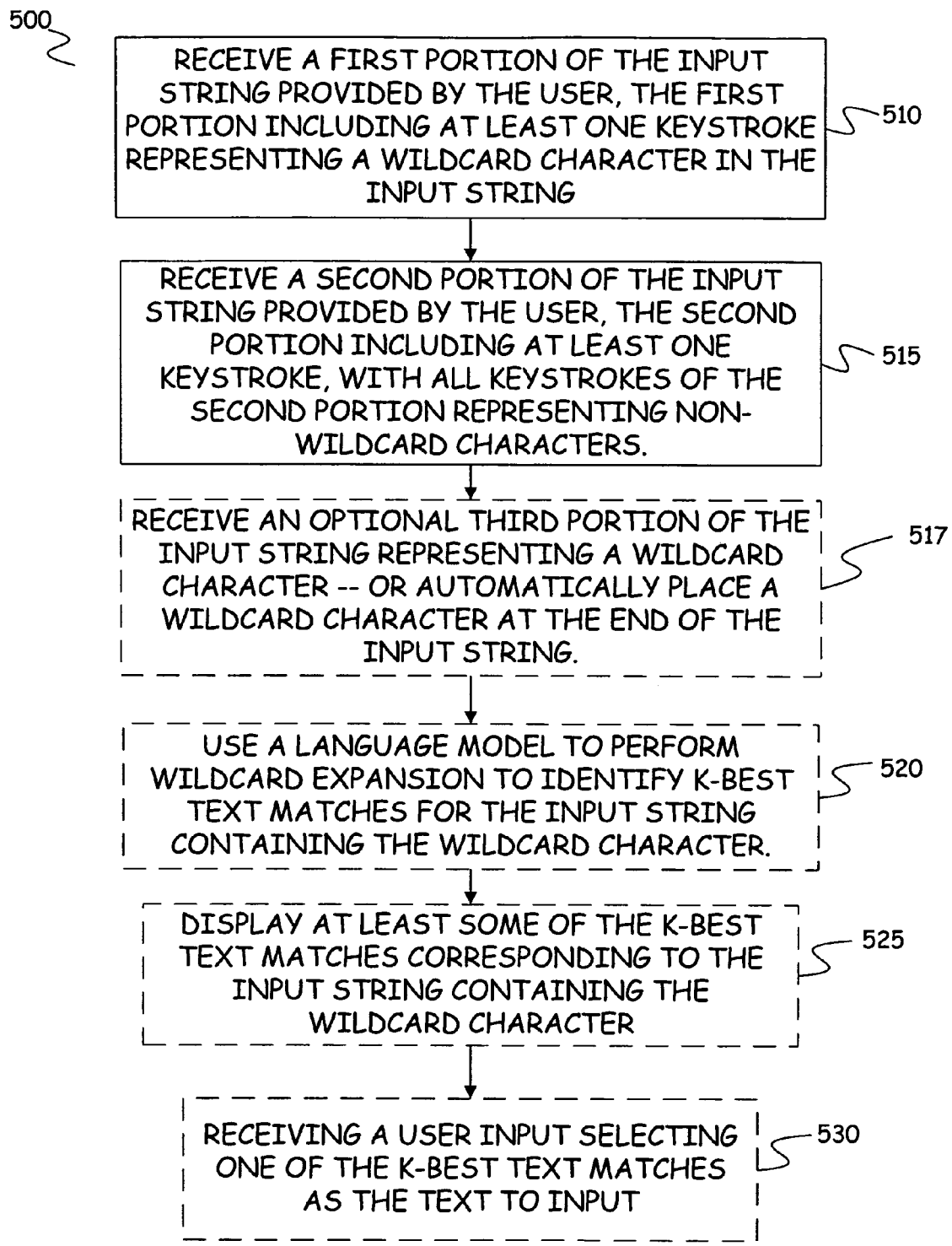
FIG. 5 is a flowchart illustrating a method of inputting text.

Referring now to FIG. 5, shown is a flow diagram 500 illustrating methods of inputting text. In some embodiments, the methods illustrated in FIG. 5 are methods of inputting text using mobile devices with a limited character keypad having multiple different letters associated with each of a plurality of numbered keys. In other embodiments, the methods illustrated in FIG. 5 are methods of inputting text with other keyboards or text entry devices, with the methods being implemented in mobile or non-mobile computing environments.

As shown at block 510, the methods include receiving from the user a first portion of the input string, with the first portion including one or more wildcard characters. Receiving the first portion can be in the form of one or more keystrokes representing at least one wildcard character. Other non-wildcard characters can also be included in the first portion of the input string. For example, receiving the first portion of the input string can include receiving at least one keystroke on a limited character keypad, on a keyboard, or other input device, representing at least one wildcard character of the input string. Other non-stroke techniques can be used as well for other types of input devices. The string can thus begin with a wildcard character (e.g., *mail), or one or more wildcards can appear anywhere in this first part of the input string (e.g., h*m*).

Then, as illustrated at block 515, the method includes receiving from the user a second portion of the input string in the same manner as the first portion was received. The second portion includes keystrokes, etc., representing at least one non-wildcard character. Wildcard characters are not allowed in the second portion. As shown in the optional block 517 (shown in dashed lines), if desired, the input string can be entered in one further portion, including placing a wildcard character at the end of the string, though the disclosed systems can place a wildcard character in the end position automatically in some embodiments. Additionally, the steps shown at blocks 510 and 517 can include receiving the input string portions in a single-tap or multiple-tap approach or technique.

In still other embodiments of the illustrated methods, further steps are added in addition to the string entry steps described with reference to blocks 510 and 515. For example, these are illustrated in dashed lines in FIG. 5. As shown at block 520, the method includes using a language model to perform wildcard expansion on the input string to identify the k-best matches corresponding to the input string containing the wildcard character. In exemplary embodiments, this step includes identifying the k-best matches from an index of possible text matches based on scores from the language model. As described above, any suitable language model can be used, with one exemplary embodiment being a trigram language model implemented via a Golomb code.

Next, as shown at block 525, the methods can include the step of displaying at least some of the identified k-best text matches corresponding to the input string containing the wildcard character. This step can also include displaying the k-best text matches, as the first, second and optional third portions of the input string are received, in a word wheeling format. In these embodiments, the k-best matches are being determined for whatever portion of the string has been entered, even before entry of all portions is complete. Finally, as illustrated at block 530, the methods can include receiving a user input selecting one of the k-best text matches as the text to input.

Referring back to FIG. 4, in another embodiment, system 400 can represent an input method editor (IME) system. For example, system 400 can represent an IME system of the type used to enter text in a second language (e.g., an Asian language such as Chinese, Japanese, etc) by inputting text strings in a first language (e.g., English), with the text strings in the first language representing a phonetic pronunciation in the first language of the desired text in the second language. For example, input device 405 can be used to enter first language characters forming a phonetic pronunciation in the first language of text in the second language, as is done in known IMEs. However, in accordance with concepts disclosed here, the input string provided in the first language includes wildcard characters to decrease the time required to input the phonetic pronunciation in the first language. Processing circuitry 410 (with wildcard expansion 415) can then be configured to use a suitably trained language model 425 to identify the k-best text matches 430 in the second language corresponding to the input string in the first language. This can be done using an index 420. The k-best second language text matches can then be displayed to the user on display device 435, and the user can select the intended second language text to input.

As an example, the English language input string 'y*n' could be completed as the phonetic pronunciations 'yan' and 'yuan', which could then produce Chinese language text matches such as 眼, 烟, 沿, 盐, 远, 员, 元, ..., etc.

A method of inputting text in an IME of this type is illustrated in the flow diagram 600 shown in FIG. 6. As shown at block 605, the method includes the step of receiving an input string representing, in a first language, characters forming at least a portion of a phonetic pronunciation in the first language of intended text in a second language, with the input string including at least one wildcard character. Then, as shown at block 610, the method includes the step of using a language model to identify text matches, in the second language, corresponding to the received input string including at least one wildcard character. As in other embodiments described above, this includes wildcard expansion of the input string. At the step shown in block 615, the method includes displaying to the user the identified text matches, in the second language, corresponding to the received input string including the at least one wildcard character. Finally, the method includes the step shown at block 620 of selecting in response to a user input one of the identified text matches, in the second language, as the text to input.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of inputting text using a mobile device with a limited character keypad having multiple different letters associated with each of a plurality of numbered keys, the method comprising:
   receiving from a user a first portion of an input string comprising at least one keystroke on the limited character keypad, the first portion of the input string representing at least one wildcard character;
   receiving from the user a second portion of the input string comprising at least one keystroke on the limited character keypad, after the first portion of the input string representing the at least one wildcard character, with all keystrokes of the second portion representing non-wildcard characters; and
   after receiving the second portion of the input string, further comprising automatically inserting an additional wildcard character at the end of the input string after receiving the second portion of the input string.

2. The method of claim 1, and after receiving the second portion of the input string, further comprising receiving from the user a third portion of the input string comprising a keystroke on the limited character keypad representing an additional wildcard character at the end of the input string.

3. The method of claim 1, and further comprising using a language model to perform wildcard expansion to identify k-best text matches corresponding to the input string containing the at least one wildcard character.

4. The method of claim 3, and further comprising displaying on the mobile device at least a plurality of the k-best text matches corresponding to the input string containing the at least one wildcard character.

5. The method of claim 4, and further comprising receiving a user input selecting one of the k-best text matches as the text to input.

6. The method of claim 5, wherein the k-best text matches, corresponding to the input string containing the at least one wildcard character, are identified from an index of possible text matches based on scores determined using the language model.

7. The method of claim 5, wherein the language model is a trigram language model.

8. The method of claim 7, wherein the language model uses a Golomb code.

9. The method of claim 5, wherein receiving from the user the first and second portions of the input string comprises receiving the first and second portions of the input string using at least one of a multiple-tap input technique and a single-tap technique on the limited character keypad.

10. The method of claim 5, and further comprising displaying, as the first and second portions of the input string are received, text matches in a word wheeling format.

11. A portable electronic device configured to implement the method of claim 1.

12. A computer-readable medium having computer-executable instructions stored thereon for implementing the steps of method claim 1.

13. A method of inputting text, the method comprising:
receiving from a user a first portion of an input string comprising at least one keystroke, the first portion of the input string representing at least one wildcard character;
receiving from the user a second portion of the input string comprising at least one keystroke, after the first portion of the input string representing the at least one wildcard character, with all keystrokes of the second portion representing non-wildcard characters; after receiving the second portion of the input string, automatically inserting an additional wildcard character at the end of the input string;
using a language model to perform wildcard expansion to identify k-best text matches corresponding to the input string containing the at least one wildcard character;
displaying to the user a plurality of the k-best text matches corresponding to the input string containing the at least one wildcard character, further comprising displaying, as the first and second portions of the input string are received, text matches in a word wheeling format; and
selecting one of the k-best text matches, as the text to input, in response to a user input.

14. The method of claim 13, and after receiving the second portion of the input string, further comprising receiving from the user a third portion of the input string comprising a keystroke representing an additional wildcard character at the end of the input string.

15. The method of claim 13, wherein the k-best text matches, corresponding to the input string containing the at least one wildcard characters, are identified from an index of possible text matches based on scores determined using the language model.

* * * * *